United States Patent [19]

Konishi

[11] 4,330,815
[45] May 18, 1982

[54] DC TRANSMISSION CONTROL SYSTEM

[75] Inventor: Hiroo Konishi, Katsuta, Japan
[73] Assignee: Hitachi, Ltd., Tokyo, Japan
[21] Appl. No.: 145,741
[22] Filed: May 1, 1980
[51] Int. Cl.³ ............................................... H02J 3/36
[52] U.S. Cl. ................................................... 363/35
[58] Field of Search ........................ 363/35, 37, 95, 51

[56] References Cited
U.S. PATENT DOCUMENTS

| 3,801,895 | 4/1974 | Kanngiesser | 363/35 |
| 3,886,433 | 5/1975 | Watanabe | 363/95 |
| 4,205,368 | 5/1980 | Erche et al. | 363/35 |

*Primary Examiner*—A. D. Pellinen
*Attorney, Agent, or Firm*—Craig and Antonelli

[57] ABSTRACT

A DC power transmission control system for a DC line inserted between a pair of converters comprises a transformer provided on the AC side of each of the converters for maintaining constant the no-load voltage on the converter side by tap position control. One of the converters is operated as an inverter for control of the DC voltage. The control angle of the converter operated as the inverter is controlled by a signal associated with, e.g., a DC current as a load. The DC terminal voltages of the converters are made variable, thus reducing the amount of increase in the reactive power of the rectifier under a small load condition.

10 Claims, 5 Drawing Figures

DC TRANSMISSION CONTROL SYSTEM

The present invention relates to a DC power transmission control system, or more in particular to a control system suitable for use with a long-distance DC power transmission system.

Well-known control systems capable of providing power assistance or power backing rapidly and in a large amount in cases of emergency by DC transmission include U.S. Pat. No. 3,886,433 (British Pat. No. 1,440,368, West German Patent Publication No. (DT-AS) 2,340,669, Swedish Pat. No. 608,490 and U.S.S.R. Patent No. 1,952,230). The present invention basically employs this system, which will be briefly described. Two converters (AC-DC and DC-AC) are connected with each other by a DC line, and an AC terminal of each of the converters is connected to an AC system through a tapped transformer. In this system, the tap position of the transformer is determined in such a manner that the no-load secondary voltage of the transformer is constant. In other words, the tap position of the transformer is always controlled in such a manner as to maintain the secondary voltage (on the converter side) at a predetermined value under the no-load condition regardless of what value the secondary voltage of the transformer takes under any load condition. According to this system, as explained in detail in the above-listed patent, power assistance in case of emergency is provided only by manipulation of the control angle or firing angle of the AC-DC/DC-AC converters, thus making possible power assistance rapidly and in a large amount.

As for an inverter (DC-AC converter), the firing angle control of the inverter is such that control is effected to make the DC voltage constant. Thus, in view of the above-described tap control of the transformer on the inverter side, the inverter control may be considered as a constant power factor control. Specifically, as is well-known, the power factor $\cos \phi$ of the converter is approximately expressed by the equation below.

$$\cos \phi = V_d / 1.35 E_2 \quad (1)$$

where $V_d$ is a DC voltage, $E_2$ the voltage of the transformer on the converter side, and $\phi$ the control angle or the firing angle. In equation (1), $E_2$ is maintained constant by the tap control of the transformer, and $V_d$ is determined by the constant voltage control of the inverter. As a result, the power factor $\cos \phi$ of the inverter is determined to be a fixed value regardless of changes in other factors. In contrast, the DC terminal voltage $V_{dr}$ of the AC-DC converter (rectifier) in a constant current control system is determined as a sum of the said constant terminal voltage $V_{di}$ of the inverter and the line voltage drop $I_d \cdot R_l$. For this reason, as is obvious from equation (1), in spite of the fact that $E_2$ is constant, the DC voltage $V_d$ changes with a change of the load (i.e., power $I_d$), resulting in a change in the power factor $\cos \phi$.

As a result of this change in the power factor, the reactive power consumed by the rectifier increases under a small load condition.

$$Q = \sqrt{3} \, E_2 \sqrt{\frac{6}{\pi}} \, I_d \sin \phi \quad (2)$$

Equation (2) above is equivalent one for the reactive power Q. In this equation, the no-load secondary voltage $E_2$ is fixed constant by the tap control of the transformer, and the DC current $I_d$ decreases under a small load condition. In view of the fact that the control angle $\phi$ increases under a small load condition (this being obvious from the fact that in equation (1) $E_2$ is controlled to be constant and $V_d$ is reduced under a small load condition), however, the value of $\sin \phi$ increases under a small load condition. The increase quantity of $\sin \phi$ is greater than the decrease quantity of $I_d$, and therefore as a whole the reactive power Q increases under a small load condition. The amount of increase of Q is determined by the amount of change in the DC voltage $V_{dr}$ at the end of the rectifier. Therefore, the longer the line, i.e., the greater the impedance $R_l$, the larger the amount of change of Q. This poses a problem especially when the rectifier is connected to a weak system for long-distance power transmission. In such a case, it is necessary to take into consideration the reduction in system stability caused by consumption of an unnecessarily large reactive power under a small load condition. The reactive power Q at the terminal of the inverter decreases with a decrease of the DC current $I_d$ since the control angle $\phi$ is fixed. This improves the system stability and is desirable.

In short, the above-mentioned system for maintaining the secondary voltage of the transformer constant under the no-load condition is very effective from the viewpoint of emergency power assistance (power backing). If it is to be used with a weak system, however, it requires a further improvement from the standpoint of reactive power.

The above-mentioned problem of the system for maintaining the secondary voltage constant under the no-load condition is caused by the fact that since one of the ends of the transmission line is kept at a constant DC voltage, all the voltage change due to the line drop is presented as a voltage change at the other end.

Accordingly, it is the object of the present invention to provide a DC power transmission control system capable of improving the system stability under a small load condition in the operation of a system for controlling the no-load secondary voltage of a transformer to be a fixed value.

According to the present invention, one of two converters (one being an AC-DC converter, the other being a DC-AC converter) is subjected to a variable DC voltage control in accordance with the weight or value of the load (DC current). The variable DC voltage control is such that the DC terminal voltage of one of the converters increases while the DC terminal voltage of the other AC-DC converter decreases under a small load condition. In the present invention, a voltage change caused by the line drop is generated at both ends of the line, thus effectively suppressing the increase in the reactive power as far as possible.

The above and other objects, features and advantages will be made apparent by the detailed description taken in conjunction with the accompanying drawings, in which.

Figure 1:
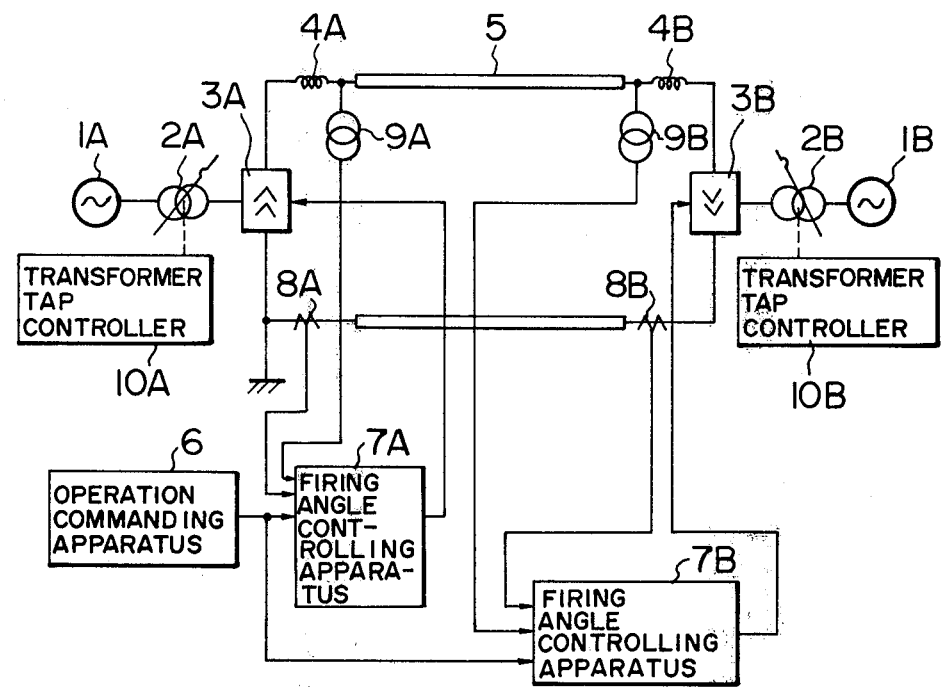
FIG. 1 is a diagram showing schematically a configuration of a DC power transmission system and a control system therefor to which the present invention is applicable.

An embodiment of the present invention will be described with reference to the accompanying drawings. A general configuration of a DC power transmission system to which the present invention is applicable is shown in FIG. 1. In this drawing, the equipment for end station A is designated with symbol "A" and the equipment for end station B with symbol "B". In view of the fact that the equipment for both the end stations are the same, the symbols "A" and "B" will be omitted except when they are required to be distinguished from each other. Reference numeral 3 shows a converter, the DC terminal of which is connected to the other end station through DC reactors 4 and a power transmission line 5. The AC terminal of the converter 3 is connected to an AC system 1 through a tapped transformer 2. In this DC power transmission system, what is to be controlled includes the tap position of the transformer 2 and the firing angle of the converter 3. As to the tap position, the no-load secondary voltage is controlled to be constant by tap controller 10. This controller 10 is described in detail in U.S. Pat. No. 3,886,433 mentioned above and therefore will not be explained in this specification. The firing angle of the converter 3 is determined by the output of the firing angle controlling apparatus 7, which apparatus is supplied with the outputs of a DC voltage detector 9, a DC current detector 8 and an operation commanding apparatus 6.

Figure 2:
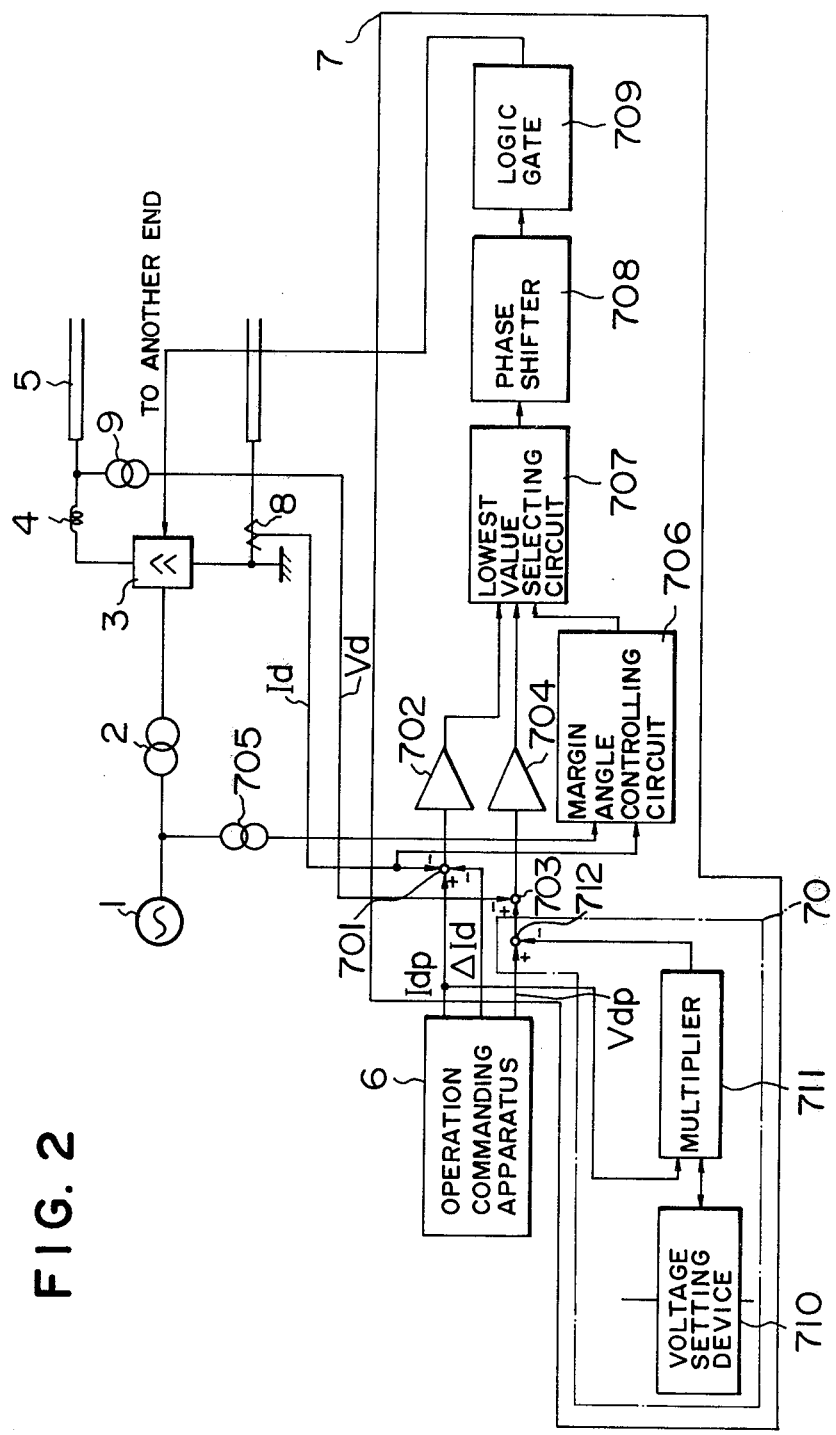
FIG. 2 is a diagram showing an embodiment in detail of a control system at one end according to the present invention.

The operation commanding apparatus 6 and the details of the firing angle controlling apparatus 7 are shown in FIG. 2. This drawing deals with only one end station, the other end station being equipped with a firing angle controlling apparatus 7 of the same configuration. Various setting signals are supplied also from the operation commanding apparatus 6 to the apparatus 7 in the other end station. With reference to this drawing, a circuit configuration employed in the prior art will be explained, followed by the explanation of the operation of an additional part 70 provided according to the invention (the part surrounded by a chain line). The operation commanding apparatus 6 supplies a DC current set value $I_{dp}$, a current margin set value $\Delta I_d$ and a DC voltage set value $V_{dp}$ to the firing angle controlling apparatus 7 of the end station. Numeral 701 shows a subtractor for subtracting the output $I_d$ of the DC current detector 8 and the current margin signal $\Delta I_d$ from the DC current command value $I_{dp}$ of the operation commanding apparatus 6, and numeral 702 a current error amplifier for amplifying the output of the subtractor 701. The component parts 701, 8 and 702 make up a constant current control circuit. Numeral 703 shows a subtractor for subtracting the output $V_d$ of the DC voltage transformer 9 from the set value $V_{dp}$ of the DC voltage from the operation commanding apparatus 6, and numeral 704 a voltage error amplifier for amplifying the output of the subtractor 703. The component parts 703, 9 and 704 make up a constant voltage control circuit. Numeral 705 shows an AC voltage transformer for detecting the voltage at the AC-DC junction, and numeral 706 a margin angle controlling circuit for producing a margin angle required for stable operation of the converter 3 serving as an inverter from the outputs of the AC voltage transformer 705 and the DC current detector 8. This margin angle controlling circuit 706 operates as a backup for the constant voltage control circuit. Numeral 707 shows a lowest-value selecting circuit which produces a signal representing the lowest value of the inputs from the three circuits 702, 704 and 706. Numeral 708 shows a well-known automatic pulse phase shifter, and numeral 709 a logic gate.

In this configuration, the current margin $\Delta I_d$ for one end station is zero, while it takes an appropriate value for the other end station. The relation of the values of the outputs of the circuits 702, 704 and 706 are such that when the signal $\Delta I_d$ takes an appropriate value, the current error amplifier 702 is saturated, so that the output of the current error amplifier 702 takes a maximum value. In this case, the output of either the voltage error amplifier 704 or the margin angle controlling circuit 706 is selected, and this selected output causes the converter to serve as an inverter. At the end station with the current $\Delta I_d$ thereof zero, the output of the current error amplifier 702 is minimized and the output of the amplifier 702 causes the converter to serve as a rectifier. In other words, one of the converters is operated as a rectifier under constant current control, and the other of the converters is operated as an inverter under constant voltage control or constant margin angle control.

The foregoing description concerns the detailed configuration of a prior art circuit portion. According to the present invention, component parts mentioned below are added. They include a voltage setting device 710, a multiplier 711 for multiplying the output of the voltage setting device 710 by the output of the operation commanding apparatus 6, and a subtractor 712. The outputs of the multipliers 711 are applied to the rectifier and the inverter. In the former case, the output of the constant current control system (amplifier 702) is selected, and in the latter case, the output of the constant voltage system (amplifier 704) or the constant margin angle control system (amplifier 706) is selected, by setting the gain of the control system or the output signal thereof appropriately. The reason why the output of the multiplier 711 is also applied to the rectifier is that the operation of the inverter may be changed to that as a rectifier by a power reversal.

In the system of this configuration, the voltage set value $V_{dp}$ is reduced by the subtractor 712 to a value lower by the output signal value of the multiplier 711. The output of the multiplier 711 changes with the current set value $I_{dp}$, and therefore the control system including component parts 712, 703 and 704 make up a variable voltage control system variable in accordance with the load. If the output of the voltage setting device 710 is set at, say, a value equivalent to about $\frac{1}{2}$ of the resistance $R_l$ of the DC power transmission line, the DC line voltages $V_{di}$ and $V_{dr}$ take values as shown in FIG. 3.

Figure 3:
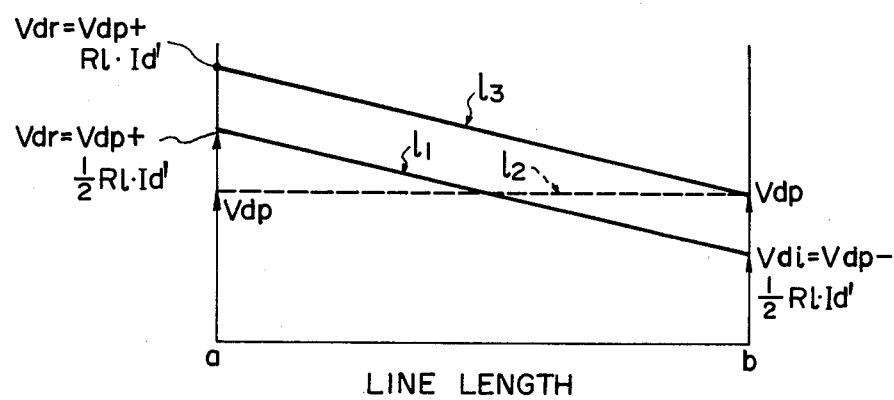
FIG. 3 is a diagram showing a voltage distribution in a DC line according to the present invention.

In FIG. 3, the abscissa represents the line length (distance) of the DC transmission line, wherein the right-hand end b denotes an inverter end and the left-hand end a denotes a rectifier end. The ordinate represents a voltage. The curves $l_1$, $l_2$ and $l_3$ show voltage distributions on the assumption that the impedance distribution is uniform. In this drawing, when the DC current $I_d$ is a rated value $I_d'$, the terminal voltage $V_{di}$ of the inverter (corresponding to the output of the subtractor 712) is $V_{di} = V_{dp} - \frac{1}{2}R_l I_d'$. In this case, the terminal voltage $V_{dr}$ of the rectifier is the sum of $V_{di}$ and the line voltage drop $R_l I_d'$, and therefore $V_{dr} = V_{dp} - \frac{1}{2}R_l I_d' + R_l I_d' = V_{dp} + \frac{1}{2}R_l I_d'$. When the current is zero (under no-load condition), $V_{di}=V_{dr}=V_{dp}$. In other words, the voltage distribution on the DC line for rated load is as shown by the curve $l_1$, and the output distribution for zero load is as shown by curve $l_2$. The curve $l_3$ shows a voltage distribution for the rated load ($V_{di}=V_{dp}$, $V_{dr}=V_{dp}+R_l.I_d'$) in the prior art system (with the inverter end DC voltage being constant), while the voltage distribution for zero load is as shown by curve $l_2$. According to the present invention, the amount of change in the voltage on rectifier side is about $\frac{1}{2}$ of that in the prior art, so that the problem of an increased reactive power under a small load condition is alleviated, thus greatly contributing to improvement of system stability. On the inverter side, the voltage increases and reactive power is reduced under a small load condition, thereby also contributing to a higher stability of system operation.

This system, as will be understood from FIG. 3, is such that the voltage at a given point of the DC transmission line is fixed. For this purpose, the set voltage is compensated ($V_{dp}-R_l.I_{dp}$) as shown in FIG. 2. The same purpose is also attained by compensating for the voltage detection value and using $V_d+R_l.I_{dp}$ as a feedback signal with the set voltage fixed. This also applies to the embodiment shown in FIG. 4.

Figure 4:
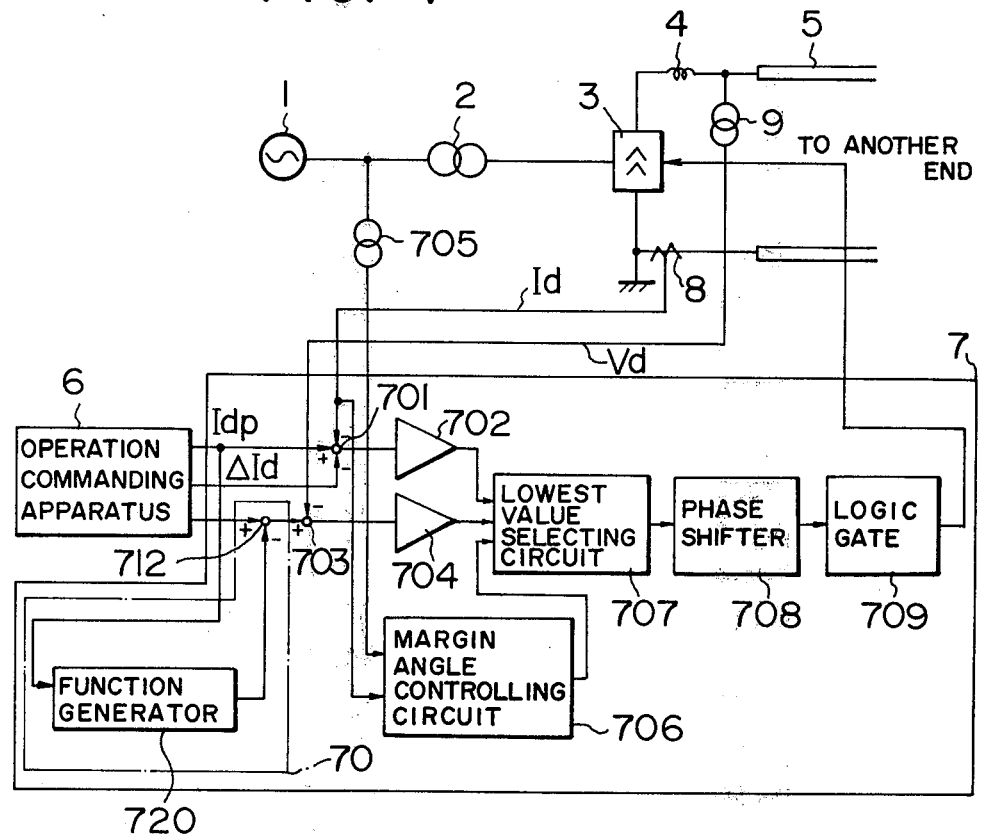
FIG. 4 is a diagram showing another embodiment of the present invention.
Figure 5:
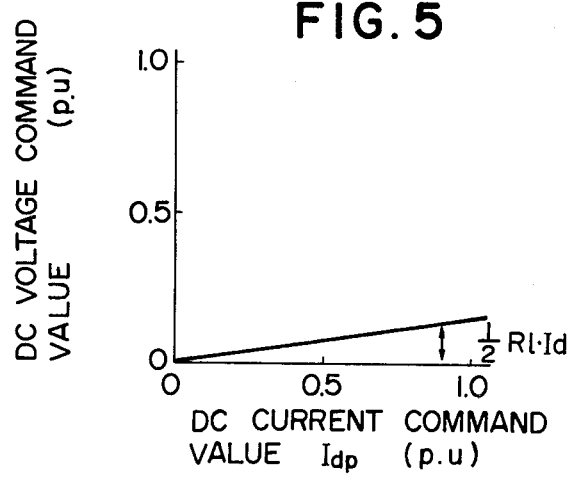
FIG. 5 is a diagram showing the characteristics of a function generator 720.

Another embodiment of the present invention is shown in FIG. 4. Unlike in the embodiment of FIG. 2 in which a voltage correction value is obtained by multiplying the DC current set value by the value of the voltage setting device, a voltage correction value is obtained from a function generator 720 in this embodiment. In the drawing under consideration, the reference numerals similar to those in FIG. 2 denote similar component elements to those in FIG. 2. An example of the characteristic of the function generator 720 is shown in FIG. 5. The characteristic is linear so that the voltage of $\frac{1}{2}R_l.I_d$ is attained at the rated current value.

It is obvious that this embodiment attains the same affect as that in FIG. 2, and the advantage of this embodiment is that the multiplying operation is simpler than in FIG. 2. The foregoing description shows the case in which the correction is effected in accordance with the current set value $I_{dp}$. This set value, however, may be replaced with equal effect by the DC current detection value $I_d$ or by directly detecting the load for correction. Further, in view of the fact that when one end voltage increases, the other end voltage drops under a small load condition to attain the object of the present invention, the output of the setting device 710 in FIG. 2 or the characteristics of the function generator in FIG. 4 are not necessarily required to be $\frac{1}{2}R_l$. In short, they may be determined in accordance with the ratio of the voltage changes at the ends (or end stations). Also, the constant voltage control of the inverter employed in the embodiment of FIG. 2 may be replaced with equal effect by the constant voltage control of the rectifier.

According to the present invention described above, reduction in system stability which otherwise might occur due to the increase in reactive power under a small load condition is eliminated. The operation of this invention does not adversely affect the secondary voltage control of the transformer under no-load conditions. In other words, the present invention has a dual advantage of emergency load assistance and improved stability under a small load condition.

What is claimed is:

1. A system for controlling DC power transmission through a DC line connecting the DC terminals of first and second converters having AC terminals for connection to respective AC systems, comprising:
    a pair of tapped transformers connected respectively to the AC terminal of said first and second converters;
    tap control means provided for each of said tapped transformers for controlling the tap position thereof in such a manner that the no-load voltage on the converter side of the associated transformer is constant;
    voltage controller means for controlling the firing angle of said first converter so that the terminal voltage of said first converter is made constant;
    current controller means for controlling the firing angle of said second converter so that the DC current in said second converter assumes a predetermined value depending on a detected load value; and
    means for compensating the output of said voltage controller means, including means for generating a compensation signal depending upon the magnitude of said load value and means for adjusting the output of said voltage controller means on the basis of said compensation signal to cause the DC terminal voltage of one of said converters to rise and that of the other converter to fall in response to a variation of the magnitude of said load value.

2. A system according to claim 1, in which the value of the DC line current constitutes said load value.

3. A system according to claim 1, in which said compensation signal generating means includes means for setting the DC terminal voltage of said first converter at such a value that the voltage at a selected point on said DC line is fixed.

4. A system according to claim 1, wherein said compensating means includes a multiplier.

5. A system according to claim 1, wherein said compensating means includes a function generator.

6. A system for controlling DC power transmission through a DC line comprising
    first and second converters each having AC and DC terminals, said first and second converters being connected to respective ends of said DC line via their DC terminals;
    first and second tapped transformers respectively connected to said first and second converters via their AC terminals;
    tap control means for controlling the tap position of each of said first and second tapped transformers in such a manner that the no-load voltage on the converter side of the associated transformer is constant;
    operation commanding means for providing a current set value signal and a voltage set value signal;
    detector means for detecting the DC voltage and DC current at each end of said line;
    voltage controller means responsive to said operation commanding means and said detector means for controlling the firing angle of said first converter so that the terminal voltage of said first converter is made constant;
    current controller means responsive to said operation commanding means and said detector means for controlling the firing angle of said second converter so that the DC current in said second converter assumes a predetermined value depending on a detected load value; and compensating means for compensating the output of said voltage controller, including means for generating a compensation signal depending on the magnitude of said load value and means for adjusting the output of said voltage controller means on the basis of said compensation signal to cause the DC terminal voltage of one of said converters to rise and that of the other converter to fall in response to a variation of the magnitude of said load value.

7. A system according to claim 6, wherein said load value corresponds to the value of the DC current of said line, and wherein said means for generating said compensation signal is responsive to said current set value signal of said operation commanding means.

8. A system according to claim 7, wherein said voltage controller means includes means responsive to said voltage set value signal, said detected DC voltage at the first converter end of the line and said compensation signal for generating a first firing angle signal for said first converter.

9. A system according to claims 6 or 8, wherein said compensation signal generating means includes a multiplier having a first input connected to receive said current set value signal and a second input connected to receive a predetermined set voltage value, the output of said multiplier providing said compensation signal.

10. A system according to claims 6 or 8, wherein said compensation signal generating means comprises a function generator connected to receive said current set value signal and produces said compensation signal at the output thereof.

* * * * *

UNITED STATES PATENT AND TRADEMARK OFFICE
CERTIFICATE OF CORRECTION

PATENT NO. : 4,330,815
DATED : May 18, 1982
INVENTOR(S) : Hiroo Konishi

It is certified that error appears in the above-identified patent and that said Letters Patent is hereby corrected as shown below:

ON THE TITLE PAGE INSERT:

-- (30) Foreign Application Priority Data

May 4, 1979 (JP) Japan.......54/54195  --.

Signed and Sealed this

Fifteenth Day of February 1983

[SEAL]

Attest:

GERALD J. MOSSINGHOFF

Attesting Officer    Commissioner of Patents and Trademarks